Aug. 19, 1924.

H. P. KRAFT 1,505,098

DUST CAP

Filed April 5, 1920

INVENTOR :
Henry P. Kraft
By Attorneys,
Fraser, Turk & Myers

Patented Aug. 19, 1924.

1,505,098

UNITED STATES PATENT OFFICE.

HENRY P. KRAFT, OF RIDGEWOOD, NEW JERSEY.

DUST CAP.

Application filed April 5, 1920. Serial No. 371,221.

*To all whom it may concern:*

Be it known that I, HENRY P. KRAFT, a citizen of the United States of America, residing in Ridgewood, in the county of Bergen and State of New Jersey, have invented certain new and useful Improvements in Dust Caps, of which the following is a specification.

This invention relates to dust caps for pneumatic valves and the like and aims to provide certain improvements therein.

In a prior application filed by me on the 19th day of December, 1919, Serial No. 346,018, I described or claimed a quick detachable dust cap comprising a sheet metal structure usually formed in two longitudinal sections, having at its foot a separately formed collar which is screw-threaded exteriorly and interiorly and having within it a nut engaging the interior screw-threads which nut travels longitudinally as the cap is rotated, thus compressing a clamping member and causing the clamping member to engage the threads of the tire valve.

According to the present invention, I provide a structure of this general type with a base portion comprising generally what may be termed a rim washer which is adapted to contact with the felloe of the wheel and which preferably carries with it a leather or other packing sleeve.

Referring to the drawings which illustrate one form of the invention,—

Fig. 4 is a perspective view showing the rim washer detached.

Figure 1:
Figure 1 is a perspective view of the cap embodying the present invention.
Figure 2:
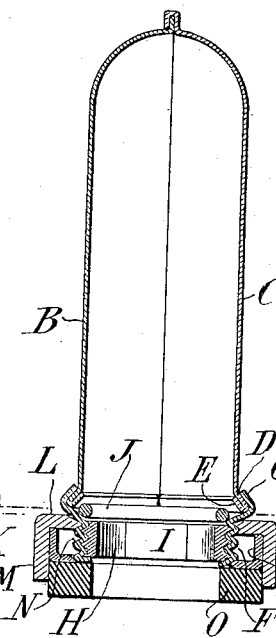
Fig. 2 is a diametrical section.
Figure 3:
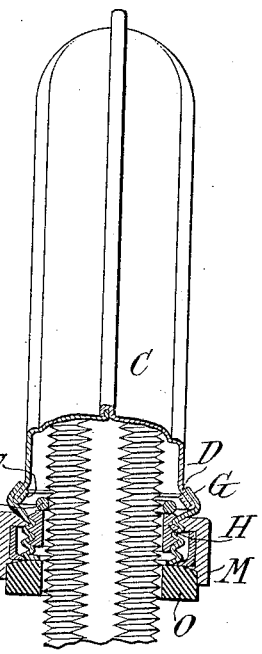
Fig. 3 is a similar view partly in elevation without showing the clamp engaged with the rim.
Figure 5:
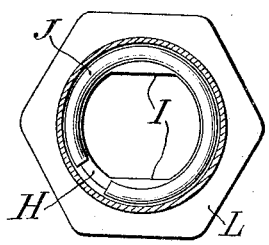
Fig. 5 is a cross-sectional view on the line 5—5 in Fig. 2.
Figure 6:
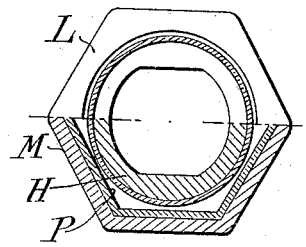
Fig. 6 is a similar view on the line 6—6 in Fig. 2 and is an underside view of the rim washer.

Referring to the drawings, let A indicate the cap as a whole which is shown as comprising two sheet metal sections B and C respectively which are flanged together longitudinally to form the main body of the cap. The lower end of the sections B and C are preferably bent outwardly as shown at D to form a shoulder and then inwardly and upwardly to form a wedging surface E. F is a sheet metal sleeve having a flange G overlying the shoulder D to connect the sleeve to the body portion of the cap. The sleeve F is screw-threaded on its interior to receive a nut H which is provided with flats I designed to engage the flats of the tire valve so that when the cap is slipped over the tire valve and rotated, the nut H travels upwardly with relation to the cap. This upward movement is utilized to contract a clamping member J shown in the form of a split ring by forcing the ring against the tapered face E. This contracting movement of the ring brings it into clamping relation to the tire valve casing as shown in Fig. 3.

According to the present invention, I provide a metallic rim washer K which preferably comprises a top flange L and a side flange M. The rim washer is preferably threaded on its top flange to engage an exterior thread N formed on the sleeve. Preferably the exterior and interior threads on the sleeve are formed in one operation by rolling or compressing. The rim washer is screwed up on the thread of the sleeve and is forcibly tightened in place.

Figure 7:
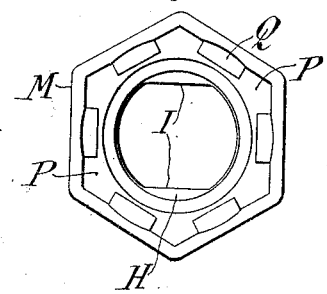
Fig. 7 is a bottom plan view of cap shown in Fig. 3, with the packing washer omitted.

The rim washer preferably carries a leather packing washer O and in order that the packing washer may extend a suitable distance below the face of the rim washer, a filling piece P is provided which is best constructed of sheet metal and best comprises a flange member fitting within the annular recess of the rim washer. The filling piece may be held in place by turning down tongues of metal Q from the rim washer over the top of the filling piece as shown in Fig. 7.

It will be understood that while the invention has been described as applying to a dust cap, it may be applied to other similar devices if desired.

While I have shown and described one form of the invention, it will be understood that I do not wish to be limited thereto, since various changes may be made therein without departing from the spirit of the invention.

What I claim is:

1. A dust cap for tire valves or the like having a sheet metal sleeve non-rotatably mounted at the bottom of the cap, a rim washer permanently connected to the sleeve in longitudinally fixed relation therewith, and carrying a packing gasket and a filling piece between said gasket and the top of the rim washer.

2. A dust cap for tire valves or the like having an external thread at its bottom and a rim washer carried by and rotatable with said dust cap, said rim washer being held to said cap by means of a threaded flange on said rim washer engaging the thread on the cap, and a filling piece held between said flange and the bottom of the cap.

3. A dust cap for tire valves or the like having an external thread at its bottom and a rim washer carried by and rotatable with said dust cap, said rim washer being held to said cap by means of a threaded flange on said rim washer engaging the thread on the cap, and a filling piece held between said flange and the bottom of the cap, said filling piece being held in place by metal tongues on the rim washer.

In witness whereof, I have hereunto signed my name.

HENRY P. KRAFT.